June 26, 1956 J. W. WOLFE 2,752,537

ELECTRICAL APPARATUS WIRING SYSTEM

Filed Aug. 29, 1952

INVENTOR.
JOHN W. WOLFE

BY-

ATTORNEY

United States Patent Office
2,752,537
Patented June 26, 1956

2,752,537

ELECTRICAL APPARATUS WIRING SYSTEM

John W. Wolfe, Palisades Park, N. J.

Application August 29, 1952, Serial No. 307,133

7 Claims. (Cl. 317—101)

The present invention relates to improvements in the manufacture of electrical apparatus to accomplish miniaturization and facilitate easy electrical connection of for instance resistances, inductances and capacitances in any desired circuit formation which as an assembly may also include an electronic tube device. The practice of this invention is specially adaptable in the manufacture of radio, television, electronic and other electrical apparatus utilizing the various mentioned components.

The principal object of this invention is to provide novel and improved constructions in electrical apparatus of the character mentioned, whose components are easily and quickly assembled into compact units, and particularly so that electrical connections between the components in each unit are automatically effected in accordance with a desired hook-up.

A further object hereof is to provide novel and improved constructions in electrical apparatus of the character mentioned, which are reasonable in cost, which can be assembled in proper circuit relationship by unskilled help and which are efficient in carrying out the purposes for which they are designed, and which are specially adaptable to mechanized production.

Other objects and advantages will become apparent as this disclosure proceeds.

In the accompanying drawings forming part of this specification, similar characters of reference indicate corresponding parts in all the views.

Fig. 1 is a diagrammatic showing of a portion of an electrical circuit comprising various electrical components connected in a predetermined relation. In the practice of this invention, I will show how to build a very compact unit comprising all of said shown components of simple construction which when assembled will have all of said components automatically and correctly electrically connected in accordance with the wiring diagram illustrated.

Fig. 2 shows such complete unit in elevational view.

Fig. 3 is an "exploded" view showing some of the components comprising said unit of Fig. 2, in perspective. Said unit includes an electronic tube, inductances, capacitances and spacers as well as a plug member, so that the unit may be connected with the balance of the circuit which is not shown. Most of these components are in the form of discs shown round, but which may be of any desired geometric shape, which in practice is preferably all identical. Each of these discs, plates or the like, have an identically placed series of contact elements extending from one surface to the other surface of each disc respectively.

Figures 1, 2, 3, 4, 5, 6, 7, 8, 9, 10, 11, 12:
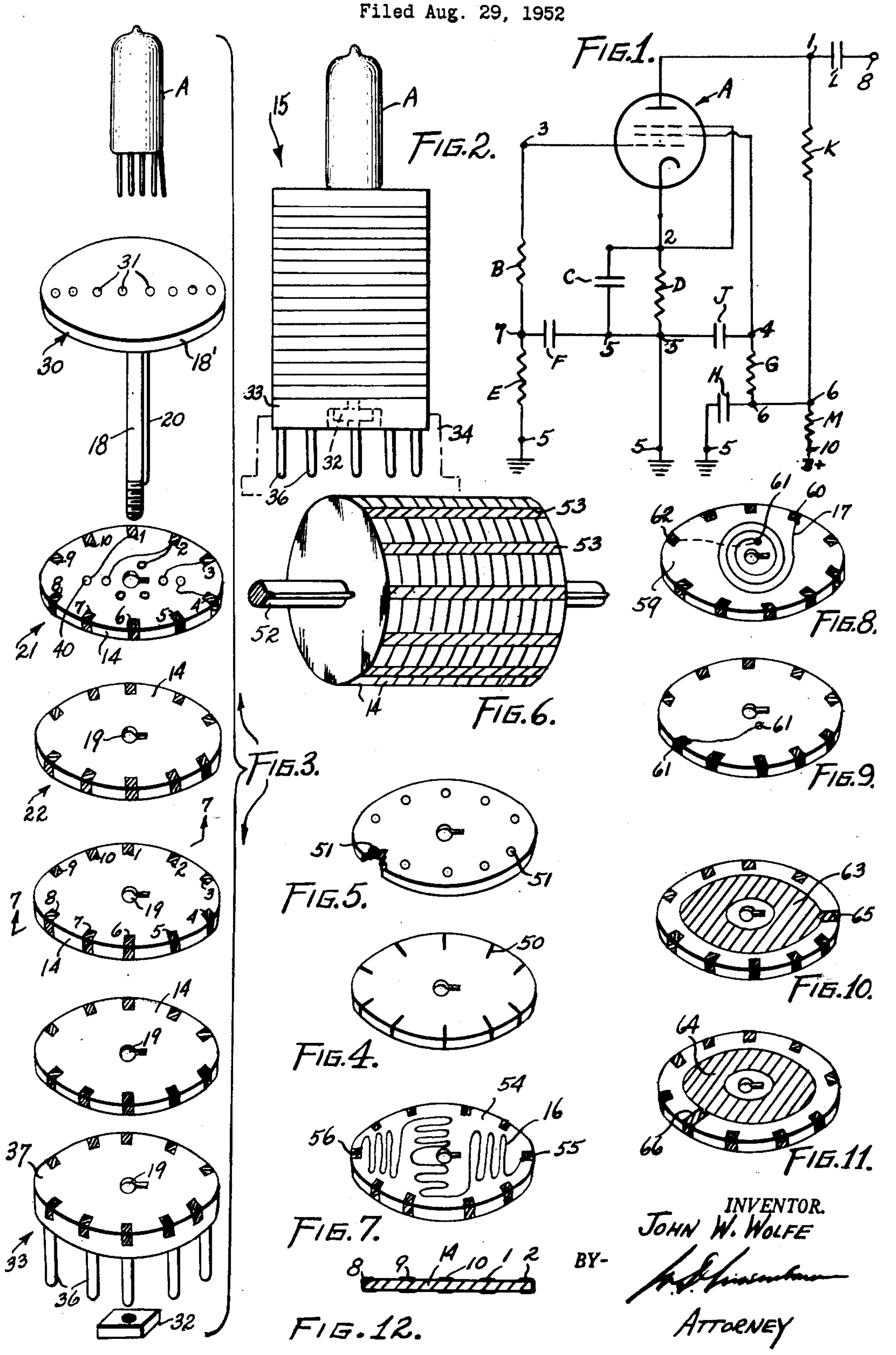
Fig. 4 shows one of these discs in perspective, provided with its series of said contact elements constructed in a certain manner as will be explained.
Fig. 5 is a similar view where the contact elements are shown differently constructed than occurs in Fig. 4.

In the manufacture of the disc-carrying circuit components, it is advisable to have them made by well known inlay, photo-etch or printed techniques. Each can have its series of contact elements provided by such methods. For instance in Fig. 6, I have shown a plurality of discs arranged as a cylinder to facilitate the printing on of said contact elements. The printing of such is shown in this view.

Fig. 7 is a perspective view showing a disc on which a resistance is printed on and the terminals thereof connected to specific two of the contact elements of the series on such disc.

Fig. 8 is a similar view of one of the discs on which is printed an inductance. This is on one surface.

Fig. 9 shows the other surface of Fig. 8, and is given to illustrate the manner in which one of the terminals of said inductance may be connected to a contact element.

Fig. 10 and Fig. 11 show the opposite faces of a disc on which is printed a condenser.

Fig. 12 is a section taken at lines 7—7 in Fig. 3.

As mentioned, and as shown in the drawings, all circuit components except the electronic tube A, are in disc form which by known processes of printing, photo-etch or inlay procedures are provided with metallic or other substance to form a resistance 16 as shown in Fig. 7, an inductance 17 as shown in Fig. 8 and a capacitance as shown in Figs. 10 and 11. Each disc 14 which is of a dielectric material, is provided with a series of contact elements of metallic substance. As illustrated, each such series comprises ten contact elements arranged in a circle in equi-spaced relation. This is suitable for the unit to make the assemblage in accordance with the circuit portion given in Fig. 1, and the like, and it is intended that the use of ten contact elements to constitute a series shall be deemed merely illustrative. So that corresponding contact elements of all the discs in assembly on the mounting shank 18 shall be over and in contact with each other respectively, each disc has a center key hole 19 for engagement of the key 20 which is longitudinally of said shank.

The manufacturer will first supply himself with the disc-form finished components. Of each kind and size he shall have as stock an assortment differing as to the two particular contact elements to which the leads are connected, meaning that there shall be capacitances whose leads are connected to contact elements 1 and 2, 1 and 3, 1 and 4 etc., 2 and 3, 2 and 4, etc., so that there shall be a capacitance whose leads are any two of the contact elements. The same applies to the other disc-form circuit components. It is practical also to have spacer discs 22 which only have the series of contact elements 1 through 10 as in Fig. 4, and a connector disc as 21 for the terminals of the electronic tube A.

Now consider the circuit assemblage shown in Fig. 1. Each terminal of each circuit component is given a different number, but all terminals which are connected together are designated by the same number. These numbers really denote the correspondingly numbered contact elements of the disc structures. In the example illustrated, the four leads of the electronic tube A are numbered 1, 2, 3, 4, respectively. Since the lead numbered 1 is connected to a terminal of each of circuit components K and L, all such connected-together terminals may be denoted by the number 1. The lead 2 is connected to a terminal of the condenser C. Hence such terminal of C is also denoted by the numeral 2. The other terminal of C is connected to ground indicated by the numeral 5. But a terminal of each of the circuit components F, H, J, E, D, M, are also connected to ground and hence are denoted by the numeral 5 too. It is evident that the terminal designations of all the circuit components can be read directly from the diagram.

A preferred assembly of the circuit components constructed as taught herein, will now be set forth.

To make the unit in the circuit arrangement shown in Fig. 1, the following are used in assembly, namely:

An electronic tube A, with its five terminals connected respectively to the contact elements 1, 2, 3, 4 of the connector disc 21;

A mounting means 30, comprising the shank 18, whose head 18' is provided with suitable apertures 31 for the tube's leads. The lower end of the said shank is threaded to receive the nut 32;

A resistance B with its terminals connected to the contact elements 3 and 7 of its disc. For convenience, this may be called a 3, 7 resistance, and such form of nomenclature will hereafter be used to designate circuit components in accordance with their lead numbers;

A 2, 5 condenser C;

A 2, 5 resistance D;

A 5, 7 resistance E;

A 5, 7 condenser F;

A 4, 6 resistance G;

A 5, 6 condenser H;

A 4, 5 condenser J;

A 1, 6 resistance K;

A 1, 8 condenser L;

A 6, 10 resistance M;

Though not shown, the heater of tube A is connected to the contact elements 5 and 9 of the disc 21;

Spacers as 22 between discs as may be required;

A plug base as 33 for mounting the unit 15 into a suitable socket 34. The prongs 36 of this plug are of course respectively connected to the contact elements 1 through 10 on the disc 37 thereof.

Of course, all circuit components chosen for assembly to make the unit 15 as in Fig. 2, need be of the respectively required sizes therefor. The discs may be mounted on the assembly shank 18 in any order and they will automatically become connected in accordance with the wiring diagram shown in Fig. 1. When the nut 32 is made tight, all corresponding contact elements of all the disc structures will be in continuous electrical contact for they are in successive physical contact, meaning, all contact elements numbered 1 will be in electrical contact, likewise, all contact elements 2, and so on. It is evident that assembly of predetermined units can be on a quick production basis by unskilled help. They are merely given a quantity of each component in separate containers. Then they merely take one article from each container and assemble them on one of the headed shanks 30, in such sequence as the containers are arranged.

Connection of the leads of the electronic tube A is first effected by passing them through the apertures 31 and then anchoring them by soldering into the individual eyelets as 40 in the connector disc structure 21; said eyelets being of metal and are respectively electrically connected to the contact elements numbered 1, 2, 3, 4, respectively of said member 21. Spacer discs 22 are used when necessary to avoid contact between circuit elements carried by adjacent discs, but it is to be noted that the contact elements on such spacers maintain the continuity of electrical contact of the corresponding contact elements of all the discs in the assembly.

It is to be noted that all electrical connections of the disc components and the continuity of electrical connection of all corresponding contact elements of all the assembled disc structures comprising the assembled unit, are automatically accomplished by merely superposing the parts and maintaining them in tight contact with each other.

It is important that all contact elements on each disc structure shall extend from one surface of such structure to the other so that when discs are superposed, there shall be contact and hence electrical continuity of corresponding contact elements of all the assembled discs. Such contact elements may be slits filled with metallic material as in Fig. 5, one of which metal-filled slit is indicated by the numeral 50. Or, such metal substance may be filled in the holes as indicated by the numeral 51 in Fig. 4. Another way is to arrange the discs on a keyed shaft 52 and print on the contact elements by means of a cylindrical roll to make the printed metal deposits indicated by the numeral 53. The discs are then taken off said shaft 52, and serve to have various formats printed on the faces thereof to form a resistance as in Fig. 7 with its leads printed to the very periphery of the dielectric disc or wafer 54, where the metal deposit of such leads will each be in contact with one of the peripheral printed-on contact elements 55 and 56, as may be selected and of course determined by the plate doing the printing of the resistance format 16.

To print an inductance 17, such format is imprinted on one surface of the disc 59 and the outside lead is made to contact a predetermined contact element as 60. The inner lead extends to contact a contact element 61 which is through the body of said disc 59, near its center. On the reverse side of this disc, the required lead is printed to connect said contact element 61 and the required one 62 of the main series of contact elements common to all the disc structures. To print a condenser as in Figs. 10 and 11, each surface is printed with a metallic substance thereover within a prescribed confined area, and each metallic covering 63 and 64 is respectively printed with a connecting lead to prescribed contact elements respectively as shown at 65 and 66.

This invention is not concerned with the manner of construction of the individual disc structures to form resistances, inductances, capacitors or other devices but is concerned that each disc structure shall be provided with the series of contact elements to which the leads are connected as mentioned and that when the disc structures are assembled, corresponding contact elements of each such series shall automatically be in electrical connection and that the required electrical relationship of the various components shall be automatically assumed upon assembly of the discs in physical superposed relation. Proper insulation between discs without affecting the required contacting of adjacent series of contact elements, is presumed, and of course such can be accomplished by having a spacer disc structure 22 between circuit component disc structures shown in Figs. 7, 8 and 10, where necessary.

It is evident that the disc structures can be made very thin and in many instances even wafer thin, thus making the unit of Fig. 2 very small indeed. Long connection wires and attending losses are eliminated. Defective circuit components are easily replaced. Cost of assembly is reduced to a minimum. By use of the teachings herein, large scale assembly is materially hastened and needs no skill whatever after initial set up of supply of parts on the assembly bench.

Another important advantage is that this technique lends itself to the high speed totally mechanized assembly of an electronic tube together with its associated circuit components.

This invention is capable of numerous forms and various applications without departing from the essential features herein disclosed. It is therefore intended and desired that the embodiments set forth herein shall be demed illustrative and not restrictive and that the patent shall cover all patentable novelty herein set forth; reference being had to the following claims rather than to the specific description herein to indicate the scope of this invention.

I claim:

1. A wiring system for electrical apparatus comprising a plurality of separate flat members of insluating material laid one on the other; each of said members having a series of spaced electrically conductive contact elements thereon arranged identically on each of said members; corresponding contact elements of each of said series on adjacent flat members being in contact with each other whereby all corresponding contact elements are in electrical connection respectively; such connections being automatically effected upon merely laying one flat member atop the other with corresponding contact elements in alignment, means to hold said flat members together to maintain them in such assembly and electrical components carried on at least some of said flat members respectively, but only one electrical component being carried on one of said flat members which carry them; the terminals of each of said electrical components being electrically connected only to predetermined contact elements respectively of the series of contact elements on its associated flat member.

2. A wiring system as defined in claim 1, wherein each of the conductive elements on a flat member, extends from one surface of said member to the other surface thereof and is exposed at such surfaces.

3. A wiring system as defined in claim 1, wherein at least one of the flat members carries no electrical component thereon and is intermediate and adjacent a pair of flat members which carry an electrical component on themselves respectively.

4. A wiring system as defined in claim 1, including cooperating means on the flat members and the means to maintain them in assembly, whereby said flat members can be associated with said assembly maintaining means only in the manner where all corresponding contact elements of all the flat members are in alignment respectively.

5. A wiring system as defined in claim 1, wherein each flat member is a disc and wherein the contact elements on each such disc are at the peripheral region thereof. arranged in circular formation.

6. A wiring system as defined in claim 1, wherein each flat member is a disc and wherein the contact elements on each such disc are on the periphery thereof.

7. A wiring system as defined in claim 1, wherein one of the end flat members includes conductive prongs extending parallel from the exposed surface thereof, away from the plane of said surface; said prongs being electrically connected to the contact elements respectively on said flat member; said prongs being insulated from each other.

References Cited in the file of this patent

UNITED STATES PATENTS

| | | |
|---|---|---|
| 2,066,876 | Carpenter | Jan. 5, 1937 |
| 2,502,291 | Taylor | Mar. 28, 1950 |
| 2,611,010 | Sass et al. | Sept. 16, 1952 |

OTHER REFERENCES

"New Advances in Printed Circuits" by the National Bureau of Standards, Miscellaneous Publication 192, issued November 22, 1948; GPO, Washington 25, D. C., pp. 30 to 32.